UNITED STATES PATENT OFFICE.

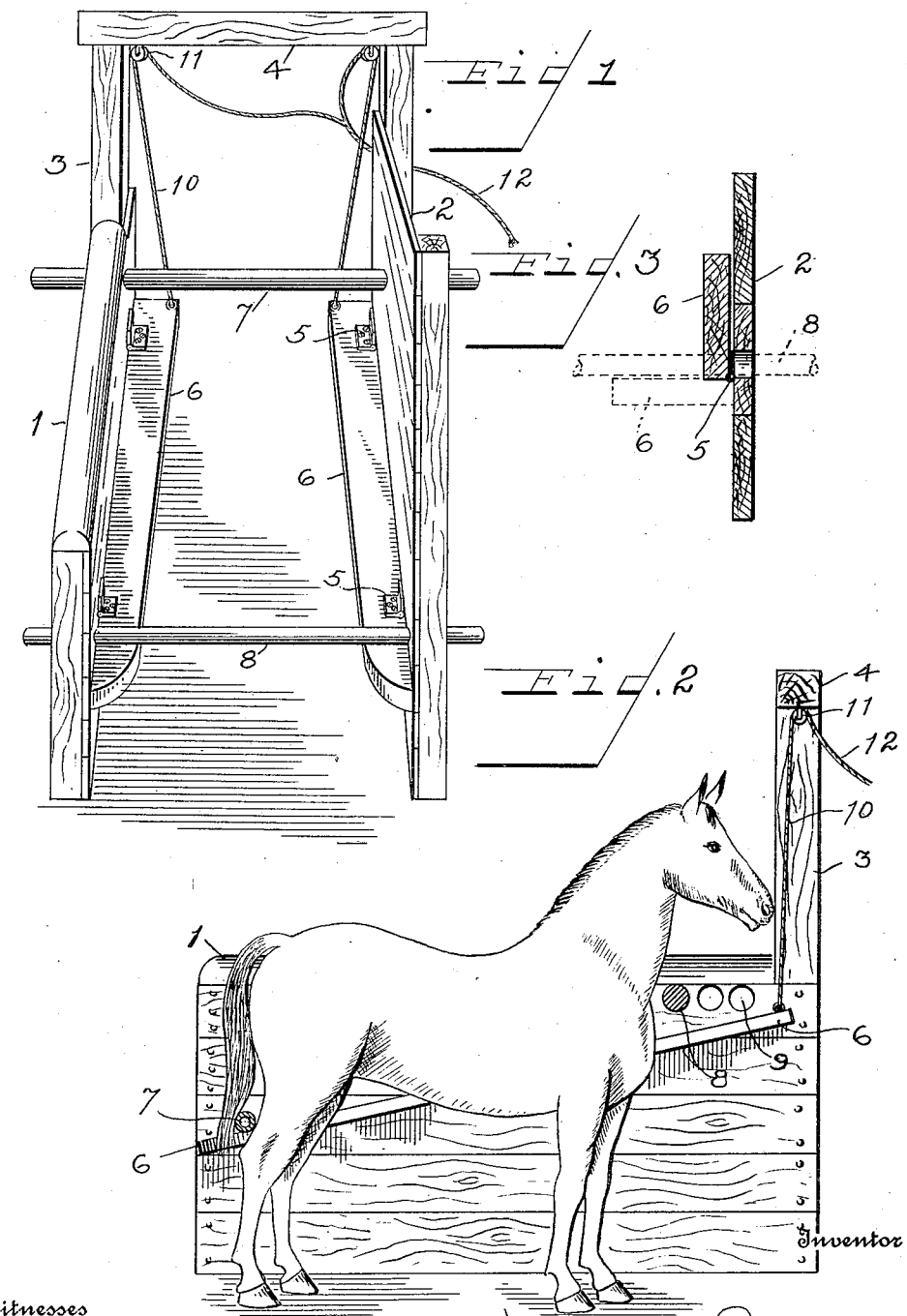

JAMES ROBERT BRYSON, OF XENIA, OHIO.

BREEDING-PEN.

1,130,062. Specification of Letters Patent. Patented Mar. 2, 1915.

Application filed June 9, 1913. Serial No. 772,603.

*To all whom it may concern:*

Be it known that I, JAMES ROBERT BRYSON, citizen of the United States, residing at Xenia, in the county of Green and State of Ohio, have invented certain new and useful Improvements in Breeding-Pens, of which the following is a specification.

My invention relates to stock racks, more particularly to breeding pens, especially adapted for horse breeding purposes, but by modification of the relative proportion of the pen, capable for use for sheep or swine breeding, cattle breeding or other veterinary or surgical purposes.

The object of the invention is to simplify the structure as well as the means and mode of operation of such devices whereby they will not only be cheapened in construction, but will be more efficient in use, positive in operation, easily and quickly adjusted and unlikely to get out of repair.

A further object of the invention is to provide improved means to insure the proper positioning of the mare or dam and to securely hold her against struggling, whereby she might be injured and to provide means for sustaining the weight of the stallion.

With the above primary and other incidental objects in view as will more fully appear in the specification, the invention consists of the features of construction, the parts and combinations thereof, and the mode of operation or their equivalents, as hereinafter described and set forth in the claims.

Referring to the drawings, Figure 1 is a perspective view of the breeding pen forming the subject matter hereof, viewed from the rear. Fig. 2 is a side elevation of the pen one side of which has been removed, showing the adjusted position of the several parts in relation with the animal. Fig. 3 is a detail view showing the position of adjustment of the side bars.

Like parts are indicated by similar characters of reference throughout the several views.

In constructing the pen, there is employed a stall open at its forward and rearward end. This stall comprises vertical side portions 1 and 2. For convenience, one side of the stall is of less height than the other to permit the operator to adjust the several parts with certainty and in order that the mare may be at all times under observation. The stall may be specially constructed as shown in the drawing or the side 2 may comprise the side of the stable, building or other structure. For convenience of illustration, the sides 1 and 2 of the stall have been shown in the drawings connected at their forward end with vertical uprights 3, which in turn are connected by an over head cross bar 4. Hinged at 5 to the opposite inner sides of the stall are adjustable side rails 6 inclined downward and rearward. These side rails 6 are adapted to be folded upward into parallelism with the sides 1 and 2 of the stall, as shown in Fig. 3 or to be turned downward into position at right angles to the sides 1 and 2, as shown in Fig. 1.

The mare to be bred is led into the stall and after the usual preliminary test to determine her condition has been made, the side rails 6 are turned downward from their original positions as shown in Fig. 3 to their adjusted positions shown in Fig. 1. These side rails 6 engage the opposite sides of the mare and serve to center her within the stall and prevent any side movement or crowding against either of the sides 1 or 2 of the stall. A transverse bar 7 is engaged with the opposite sides of the stall in front of the animal and at a height to engage her breast and prevent her escape in a forward direction. This transverse bar 7 may be engaged with the sides of the stall in any suitable manner. In actual practice it has been found desirable to provide in the side 1 of the stall a series of holes 9, through any one of which the bar 7 may be thrust and to provide in the side 2, either a similar series of holes or a series of corresponding sockets, in which the extremity of the bar 7 may engage. By inserting the bar 7 in different holes of the series, the length of the pen may be adjusted to the size of the animal.

In the rear of the animal there is provided a second transverse bar 8, located at a height to engage just above the hocks of the animal and immediately above the upper face of the rear end of the side rails 6. This rear bar 8 prevents the animal backing out of the pen and by being located closely adjacent to the upper face of said rail 6, it serves to lock the side rails in their lowermost or adjusted positions. Like the forward bar 7, this rear bar 8 is thrust through an opening in the side 1 of the stall and thence into a corresponding opening or socket in the side 2.

It has been found desirable in practice to employ a metallic rod or bar, preferably a pipe of approximately two inches in diameter for the rear bar 8. Such a metallic bar or pipe will remain smooth after long use and will not have the tendency to chafe or rub the animal, as would a wooden bar after long use. To the contrary, the bar 7 in front of the animal is preferably of wood, and of sufficient strength to resist the forward pressure of the animal within the pen. It has been found in practice that when a pipe is substituted for the bar 7, such pipe is liable to be bent by the struggles of the animal. It will thus be seen that the mare or dam is securely held against lateral movement by the side rails 6 and against fore and aft movement by the transverse bars 7 and 8, which are adjusted in relation one to the other, in accordance with the length of the animal. In the event that the mare is weak or relaxes, the excessive weight of the stallion will be supported by the engagement of his feet upon the side rails or bars 6. The stallion is thus supported independent of the mare and the latter is relieved of any excessive weight. The rear transverse bar 8 being located immediately above the hock of the animal prevents her kicking or rearing upward or backward. The animal is permitted to escape from the pen by the removal of the forward transverse bar 7. To enable the side rails 6 to be quickly and simultaneously adjusted, there is preferably though not necessarily provided cables 10, attached to the side rails 6. These cables pass over pulleys 11, suspended from the cross bar 4 and are joined into one operating cable 12. It is obvious that other means of adjustably supporting the side rails to permit their adjustment to and from each other may be employed.

From the above description it will be apparent that there is thus provided a device of the character described, possessing the particular features of advantage before enumerated as desirable, but which obviously is susceptible of modification in its form, proportion, detail construction or arrangement of parts, without departing from the principle involved or sacrificing any of its advantages.

While in order to comply with the statute, the invention has been described in language more or less specific as to certain structural features, it is to be understood that the invention is not limited to any specific details but that the means and construction herein described comprise but one mode of putting the invention into effect, and the invention is therefore claimed broadly and in any of its possible forms or modifications within the scope of the appended claims.

Having thus described my invention, I claim,

1. In a breeding pen, a stall, inclined adjustable side rails, located at opposite sides of the stall, a locking member common to both rails, whereby the rails may be simultaneously locked in a horizontal plane, said member having its ends terminating in the sides of said stall, and in a plane above and at an angle to said rails.

2. In a breeding pen, a stall, inclined side rails hinged to the opposite sides of the stall, said side rails being adjustable about their inclined axes to and from positions perpendicular to the sides of the stall, and a transverse bar engaging the opposite sides of the stall and extending adjacent to the side rails when in their adjusted position upon the sides of the stall, to and from which said rails are adjusted to lock the rails against return movement.

3. A breeding pen comprising a stall including its vertical walls, an adjustable transverse bar, inclined adjustable side rails secured to said walls, a bar having its ends secured to said side walls and positioned above said rails for locking said side rails in a horizontal position.

4. A breeding pen, comprising a stall including its vertical walls an adjustable transverse bar, inclined adjustable side rails, means for simultaneously adjusting said side rails, said means comprising a transverse bar above said rails for locking said side rails in a horizontal position.

5. In a breeding pen, a stall, inclined adjustable centering rails pivotally secured to opposite walls of said stall, a transverse bar, having its ends secured in opposite walls, and a transverse locking bar for said rails positioned above said rail to lock said rails against return movement.

In testimony whereof, I have hereunto set my hand this 31st day of May, 1913.

J. ROBERT BRYSON.

Witnesses:
  C. A. GARZHEAD,
  Mrs. E. A. CROASMUN.